United States Patent
Liu et al.

(10) Patent No.: US 7,676,118 B2
(45) Date of Patent: Mar. 9, 2010

(54) TRANSFORMATION OF EXIF IMAGES

(75) Inventors: Min Liu, Redmond, WA (US); Michael Stokes, Eagle, ID (US); Gilman K. Wong, Redmond, WA (US); Takashi Matsuzawa, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 448 days.

(21) Appl. No.: 11/836,182

(22) Filed: Aug. 9, 2007

(65) Prior Publication Data

US 2008/0025649 A1  Jan. 31, 2008

Related U.S. Application Data

(63) Continuation of application No. 10/176,130, filed on Jun. 20, 2002, now Pat. No. 7,302,118.

(60) Provisional application No. 60/355,431, filed on Feb. 7, 2002.

(51) Int. Cl.
*G06K 9/00* (2006.01)
(52) U.S. Cl. ...................... 382/306; 382/232
(58) Field of Classification Search ............... 382/306, 382/232
See application file for complete search history.

(56) References Cited

U.S. PATENT DOCUMENTS

| | | | |
|---|---|---|---|
| 5,164,831 A | | 11/1992 | Kuchta et al. |
| 6,052,692 A | * | 4/2000 | Anderson et al. ........... 707/102 |
| 6,154,755 A | * | 11/2000 | Dellert et al. ............... 715/202 |
| 6,310,647 B1 | | 10/2001 | Parulski et al. |
| 6,523,046 B2 | | 2/2003 | Liu et al. |
| 6,567,119 B1 | | 5/2003 | Parulski et al. |
| 6,711,637 B2 | * | 3/2004 | Tateyama ..................... 710/65 |
| 6,760,128 B2 | | 7/2004 | Jackson et al. |
| 6,812,962 B1 | | 11/2004 | Fredlund et al. |
| 6,914,625 B1 | | 7/2005 | Anderson et al. |
| 6,947,061 B2 | | 9/2005 | Van Epps |
| 6,950,198 B1 | | 9/2005 | Berarducci et al. |

FOREIGN PATENT DOCUMENTS

| | | |
|---|---|---|
| EP | 1 154 631 | 11/2001 |
| EP | 1 158 763 | 11/2001 |
| JP | 11019750 | 11/2000 |
| WO | WO 01/45384 A1 | 6/2002 |

OTHER PUBLICATIONS

"Digital Still Camera Image File Format Standard," Japan Electronic Industry Development Association Ver 2.1, pp. 1-66 Jun. 12, 1998.

* cited by examiner

*Primary Examiner*—Wesley Tucker
(74) *Attorney, Agent, or Firm*—Shook, Hardy & Bacon, LLP

(57) ABSTRACT

A system, media, and method for transforming a main image of a digital image in accordance with a parameter are provided. The main image that is transformed based on the parameter may be one stored in the Exchangeable Image File ("EXIF") format. In turn, the metadata, including the thumbnail image, is updated to correspond to the transformed main image. The transformed main image and updated metadata are stored together in a file using the EXIF format. Thus, the transformed main image may be viewed using a digital camera or viewer software compatible with a properly formatted EXIF file.

20 Claims, 6 Drawing Sheets

TRANSFORMATION OF EXIF IMAGES

CROSS-REFERENCE TO RELATED APPLICATIONS

This patent application claims priority and is a continuation from nonprovisional application bearing Ser. No. 10/176,130, filed on Jun. 20, 2002 now U.S. Pat. No. 7,302,118, which claims priority from the provisional application filed Feb. 7, 2002, bearing Ser. No. 60/355,431.

TECHNICAL FIELD

Embodiments of the invention relate to digital still camera images and, more particularly, to media, systems, and methods for transforming an image created by a digital still camera and storing the transformed image along with its correspondingly updated metadata.

BACKGROUND OF THE INVENTION

Cameras for taking still photographs in digital form have become very popular. Most such cameras are operable in a manner similar to traditional film cameras, except that the pictures taken are stored in electronic form, such as on a compact flash removal media card.

Early digital cameras stored pictures in various electronic file formats depending upon the camera manufacturer. As digital cameras evolved, most began to store images in digital imaging formats that specify a main image and associated metadata. One example of such digital imaging formats is the now well-known Exchangeable Image File, or EXIF, format published by the Japan Electronic Industry Development Association. Version 2.1 of the EXIF standard is a current version and is publicly available via the Internet. The EXIF standard defines a format for storing a digital image comprising a main image and certain associated metadata. The metadata can include information such as a thumbnail, or miniature, representation of the main image and information about the main image itself, including the date, time, exposure setting, global positioning satellite location and other data. The metadata may be identified using certain "tags" or field names. For example, the "Compression" tag name is a field denoting whether an image is stored in a compressed format. Under the EXIF standard, a value of "6" in the Compression tag name indicates a compressed Joint Photographic Experts Group, JPEG, image.

After taking a picture with a digital still camera, consumers often want to view the picture on a display device such as a television. However, digital photos are commonly taken with the camera rotated away from its normal level orientation. As a result, the photo taken is correspondingly rotated, and the consumer is unable to view the picture in its original orientation without rotating the picture.

A picture stored in the digital imaging formats such as the EXIF format can be modified using personal computer software, but there are limitations. Such software can transform the main image portion of the EXIF image, which is typically stored within the EXIF file as an image in the JPEG, format. Current software, however, does not properly process the EXIF metadata. Thus, upon completion of the main image transformation, the software can store the transformed main image, but then either discards the metadata or merely stores a portion of the original metadata, which no longer accurately describes the now-transformed main image. For example, the main image and its corresponding metadata might be created while the camera is rotated by 90 degrees and stored in an EXIF file. Using a PC, existing software could read the EXIF file, extract the main image and transform it by rotating it to a level orientation for viewing. However, the thumbnail representation associated with the main image remains unchanged and still 90 degrees rotated from the now-transformed main image so that the thumbnail does not accurately portray the transformed image. The remaining metadata would likewise be inaccurate, such as regarding the height and width of the now-transformed main image. Consumers may attempt to view the transformed main image using the viewer software sold with the digital camera or to upload the transformed main image to a digital camera for later viewing. However, because the metadata no longer corresponds to the transformed main image, the software and the digital camera are unable to process the digital image, causing normal operation to cease. Moreover, a loss of the metadata may adversely affect categorizing and searching for images based on the metadata. In short, no satisfactory system or method exists to transform the main image of an EXIF image, to update the metadata to reflect the transformation, and then to store the transformed main image along with the correspondingly updated metadata using the EXIF format.

BRIEF SUMMARY OF THE INVENTION

Embodiments of the invention address the limitations of conventional image transformation by providing a system and method for properly transforming a digital image including a main image and associated metadata such that the transformed metadata accurately reflects transformations made to the main image.

The method begins by obtaining a digital image from a file or other storage medium using a digital imaging format, such as the EXIF format. Such other storage media could include an input stream stored in the memory of a personal computer. The invention parses the digital imaging file or data to extract a main image and its corresponding metadata. A parameter is then obtained, such as from a user, for transforming the main image in a desired manner. Such a parameter may direct, for example, that the main image be rotated clockwise by 90 degrees. The main image is then transformed in accordance with the parameter. After the main image is transformed, the invention updates the metadata in accordance with the parameter. This updating step may include modifying a thumbnail image associated with the main image so that the thumbnail represents a miniature version of the transformed main image having a similar viewing orientation. Thus, in the present example, the thumbnail image is modified by rotating it 90 degrees clockwise to correspond to the transformation performed on the main image. The updating step further includes updating, as necessary, any other portion of the metadata that describes the main image or thumbnail image. Thus, the height and width dimensions of the main image, as stored in the metadata, are updated to reflect the transformation. The transformed main image and updated metadata are then stored in a file using the EXIF format so that an EXIF-compatible device can view the transformed digital image.

Additional advantages and novel features of the invention will be set forth in the description which follows, and in part will be apparent to those skilled in the art upon examination of the following, or may be learned by practice of the invention.

This Summary is provided to introduce a selection of concepts in a simplified form. The selection of concepts are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Embodiments of the invention are described in detail below with reference to the attached drawing figures, wherein.

DETAILED DESCRIPTION OF THE INVENTION

Figure 1:
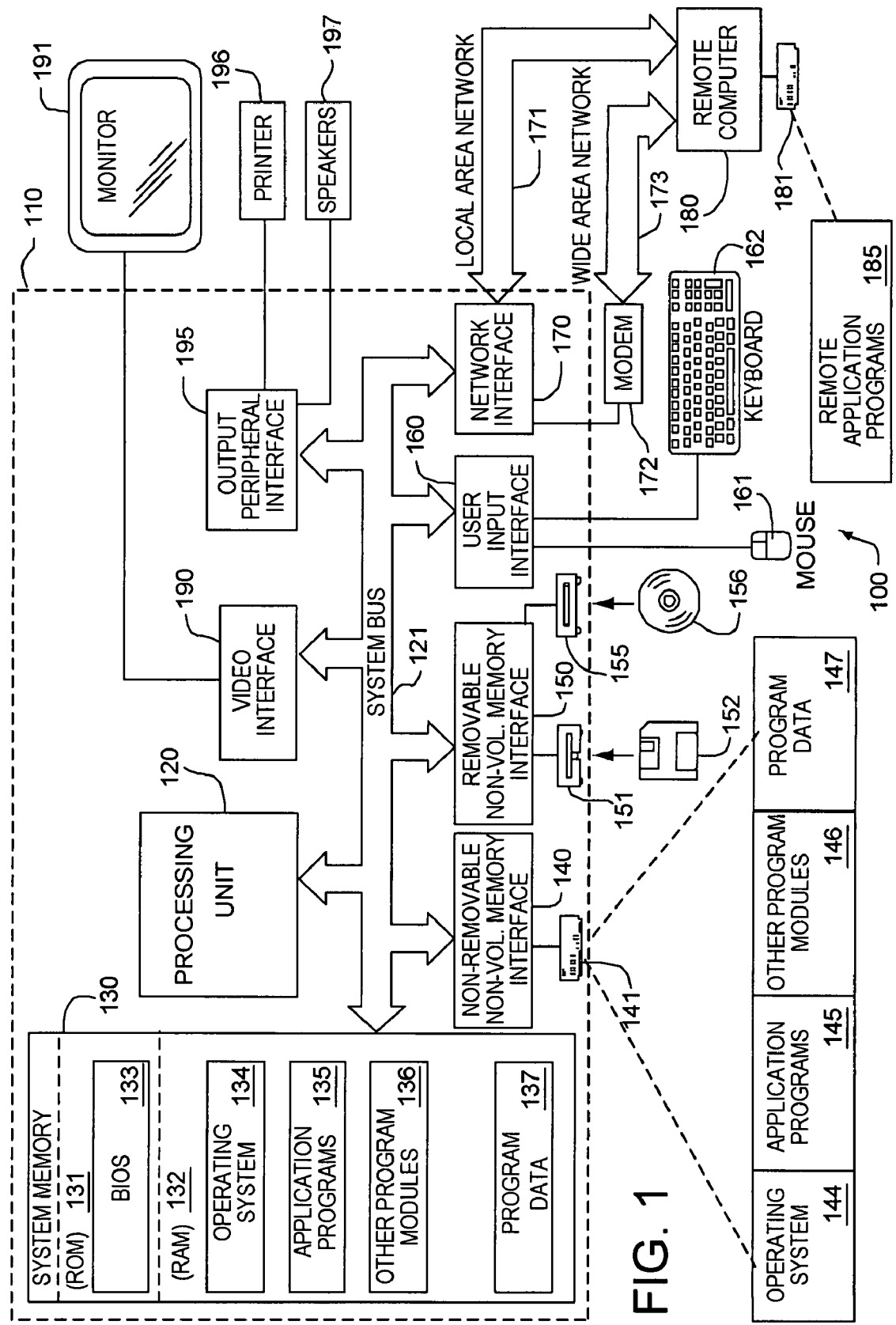
FIG. 1 is a block diagram of a computing system environment suitable for use in implementing certain embodiments of the invention on a computer.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

Some embodiments of the invention provides media, systems, and methods that enable a user to store an updated version of a digital image file, such as an EXIF file. An embodiment of the invention is suitably carried out on a personal computer, but may also be carried out in the context of a network computing environment.

In general, a digital image is created, such as by using a digital camera, and stored using the Exchangeable Image File ("EXIF") format. EXIF is a publicly available standard, well-known to those skilled in the art. The EXIF image may be stored on an electronic storage medium associated with the camera, which may be a compact flash memory device, writable CD, or other medium. Alternatively, the EXIF image may be stored as a stream in the memory of a personal computer. A consumer may transfer the digital image to a personal computer so that it can be transformed. To carry out the transformation, the consumer specifies a parameter for transforming the digital image, such as by directing software on the personal computer to rotate the digital image, change its colors, or make another modification. The EXIF file containing the desired image for transformation is then obtained by the software and stored in the memory of the computer. The main image portion of the digital image is transformed in accordance with the parameter and the metadata is updated accordingly. Specifically, embodiments of the invention rotate, resize, or otherwise as necessary transform the thumbnail image to accurately portray, in miniature form, the corresponding transformed main image. In addition, embodiments of the invention update the metadata to reflect changes in size, and other aspects that may have been modified during any transformation performed on the main image. The transformation performed on the main image and the thumbnail image can be a lossless transformation such as a lossless rotation of the image. When the desired transformations have been performed, the transformed main image and the updated metadata are stored as a digital image in a file using the EXIF format so that an EXIF-compatible device may access the digital image including both its main image and metadata, including a thumbnail image, as modified.

Having briefly described the embodiments of the invention, an exemplary operating system for some embodiments of the invention is described below:

Exemplary Operating Environment

FIG. 1 illustrates an example of a suitable local computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 operates in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed.

Transformation of EXIF Image

Some embodiments of the invention may be implemented using a personal computer, such as an IBM-compatible PC running the MICROSOFT WINDOWS operating system.

Figure 2:
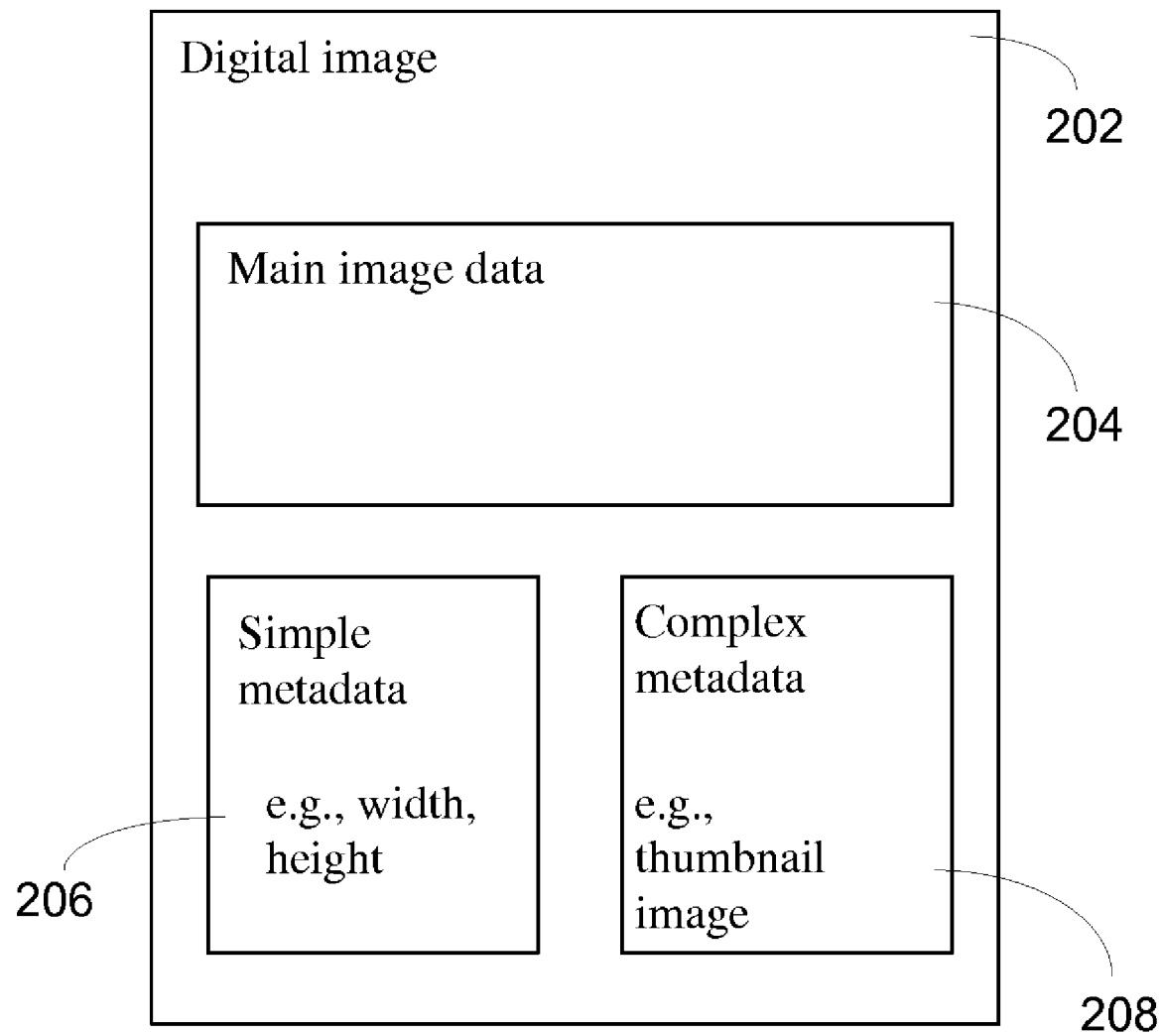
FIG. 2 is a flow chart illustrating an overview of a digital image stored in the Exchangeable Image File ("EXIF") format.

FIG. 2 illustrates an overall block diagram of the EXIF file format for a digital image. Specifically, FIG. 2 illustrates a single digital image 202 stored in the EXIF format, such as in a file on a PC or on a removable media device in a digital camera. As will be appreciated by those skilled in the art, an EXIF file may contain multiple digital images having a similar format. Each digital image 202 is generally comprised of a main image 204 and metadata 206 and 208. Simple metadata 206 can include information such as the width and height of the main image, and complex metadata 208 can include a thumbnail image, or a miniature representation, of main image 204. Further details concerning the EXIF format are set forth in the document Digital Still Camera Image File Format Standard dated Jun. 12, 1998 published by the Japan Electronic Industry Development Association (JEIDA), filed herewith and incorporated by reference herein.

Figure 3:
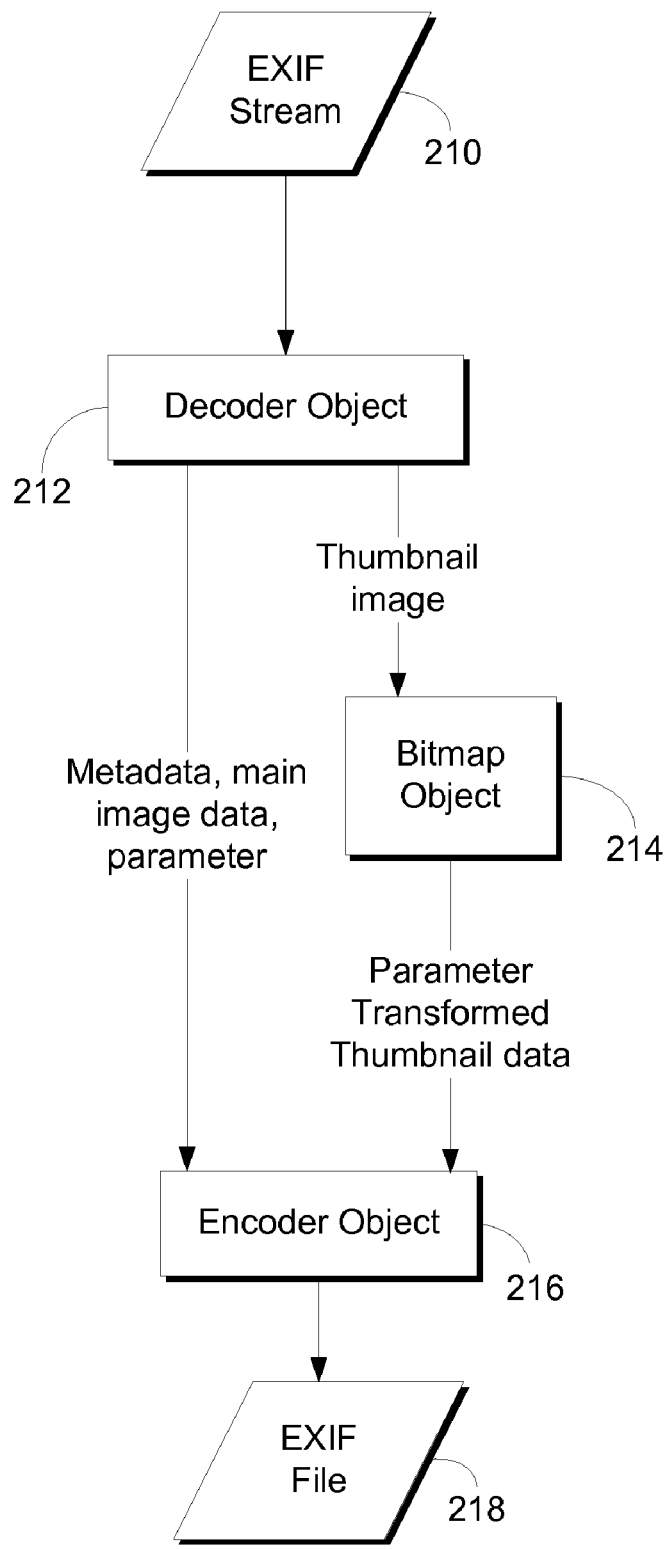
FIG. 3 is a flow chart illustrating an overview of an embodiment of the invention.

FIG. 3 illustrates an overall block diagram of an embodiment of the invention. The method begins at step 210 by accessing a stream of EXIF data. Such a stream, as will be appreciated by those skilled in the art, can reference the data stored in an EXIF-format file, for example on a PC hard disk drive, but may also reference information stored in a computer's memory that has also been obtained from an EXIF-format file or other source. The EXIF stream 210 is obtained by decoder object 212, which is discussed more fully below. Decoder object 212 obtains the main image and the metadata, including a thumbnail image, from EXIF stream 210. The thumbnail image and a transformation parameter are passed to bitmap object 214 that transforms the thumbnail image as discussed more fully below. Upon completion of this transformation, bitmap object 214 passes the parameter and the transformed thumbnail image to encoder object 216. Decoder object 212 likewise passes the remaining metadata as well as the parameter and the main image to encoder object 216. Encoder object 216 then encodes the data received from bitmap object 214 and decoder object 212 and saves the data in the EXIF file format at step 218.

Figure 4:
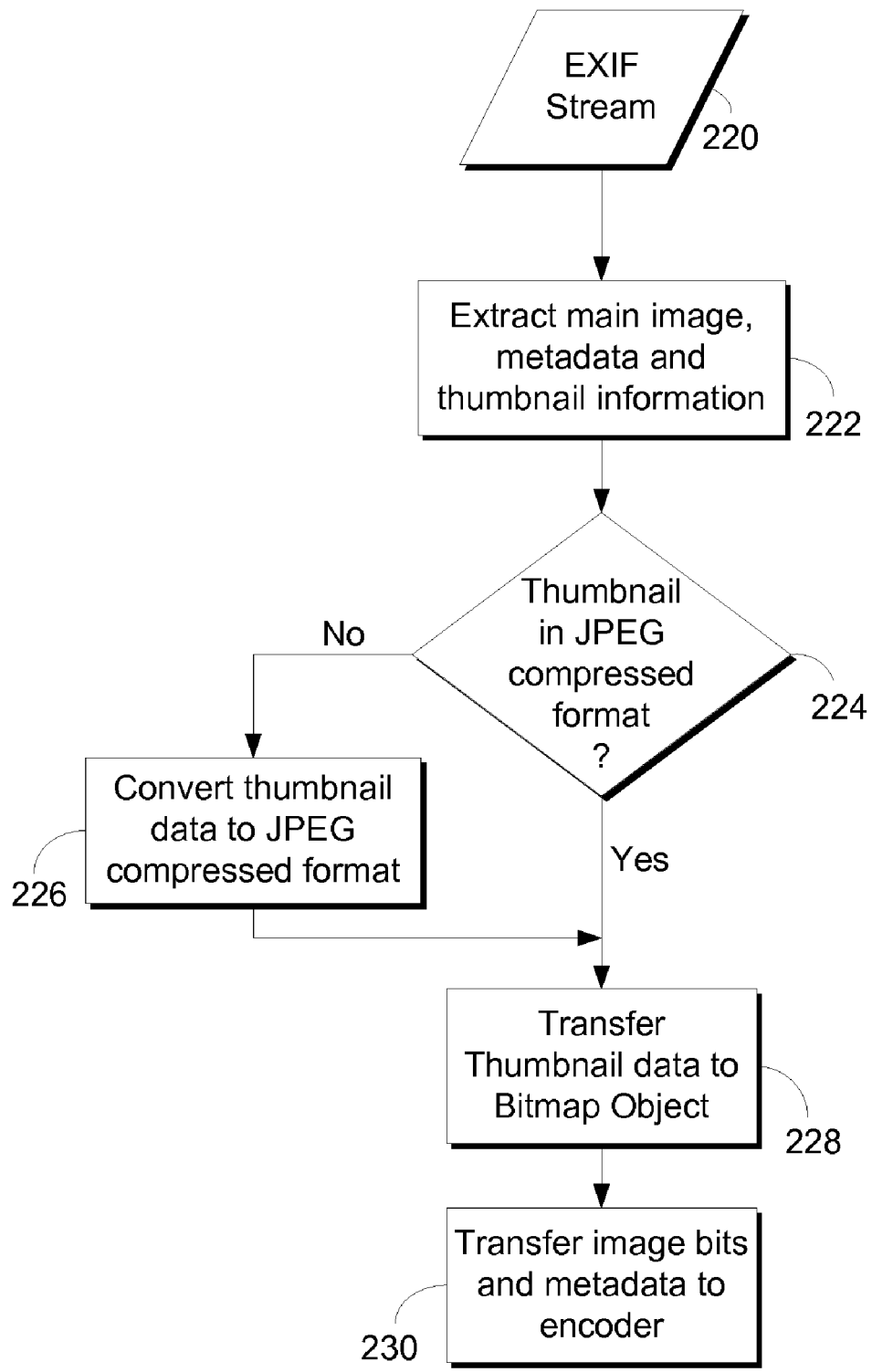
FIG. 4 is a flow chart illustrating the decoder object of an embodiment of the invention.

FIG. 4 illustrates in more detail the processes of the decoder object 212 of an embodiment of the invention. As shown therein, the decoder object accesses an EXIF stream 220. The EXIF stream contains at least one digital image in the format illustrated in FIG. 2, having a main image 204, simple metadata 206, and complex metadata 208, such as a thumbnail image or audio data. Thus, at step 222, decoder object 212 extracts a main image, metadata, and thumbnail information from the EXIF stream 220. As will be appreciated by those skilled in the art, the data so obtained could be stored in a variety of data structures. For example, for ease of processing, the metadata, including the thumbnail image, could be stored in a linked list data structure. Thereupon, at step 224, the decoder object determines whether the thumbnail extracted from the EXIF stream 220 is in the JPEG compressed format. As noted above, this format is well understood by those skilled in the art and is well suited for performing lossless transformations using publicly available software and algorithms. For example, under the EXIF standard, the compression tag associated with the thumbnail may have a value of "6" indicating that the thumbnail image is in the JPEG compressed format. If the thumbnail extracted from the EXIF stream 220 is uncompressed, then control branches to step 226 and decoder object 212 converts the thumbnail image to the JPEG compressed format. If, on the other hand, at step 224, it is determined that the thumbnail image is already in the JPEG compressed format, then control passes to step 228, and decoder object 212 transfers the thumbnail image to bitmap object 214 discussed more fully below. Thereafter, at step 230, the decoder object transfers the main image and the metadata to encoder object 216.

Figure 5:
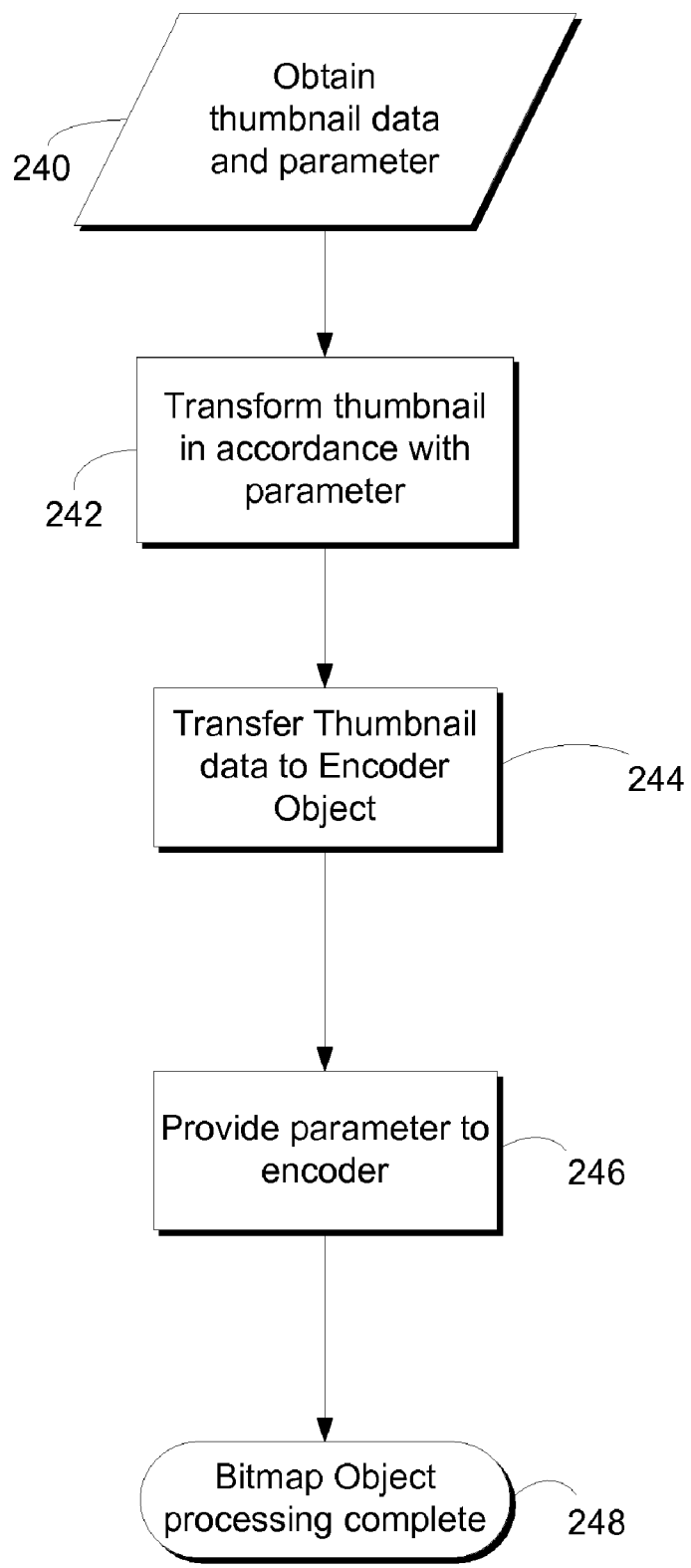
FIG. 5 is a flow chart illustrating the bitmap object of an embodiment of the invention.

FIG. 5 illustrates in more detail the operation of the bitmap object 214 of an embodiment of the invention. As will be understood by those skilled in the art, the bitmap object references an object oriented programming object, such as one created using the MICROSOFT VISUAL C++ language and the BITMAP class definition contained within the Microsoft Foundation Classes provided with the Visual C++ product. After a bitmap object 214 is instantiated, bitmap object 214 receives, at step 240, the thumbnail image and a parameter from decoder object 212. The parameter describes the transformation, such as a rotation, performed on the main image. Bitmap object 214, at step 242, then transforms the thumbnail in accordance with the parameter. For example, if the parameter directs that a 90 degree rotation be performed on the main image, then bitmap object 214, at step 242, performs a similar 90 degree rotation on the thumbnail. Control then passes to step 244, and the thumbnail data is transferred to encoder object 216. Control then passes to step 246, and the transformation data parameter is provided to the encoder object 216. In turn, at step 248, bitmap object processing is completed.

Figure 6:
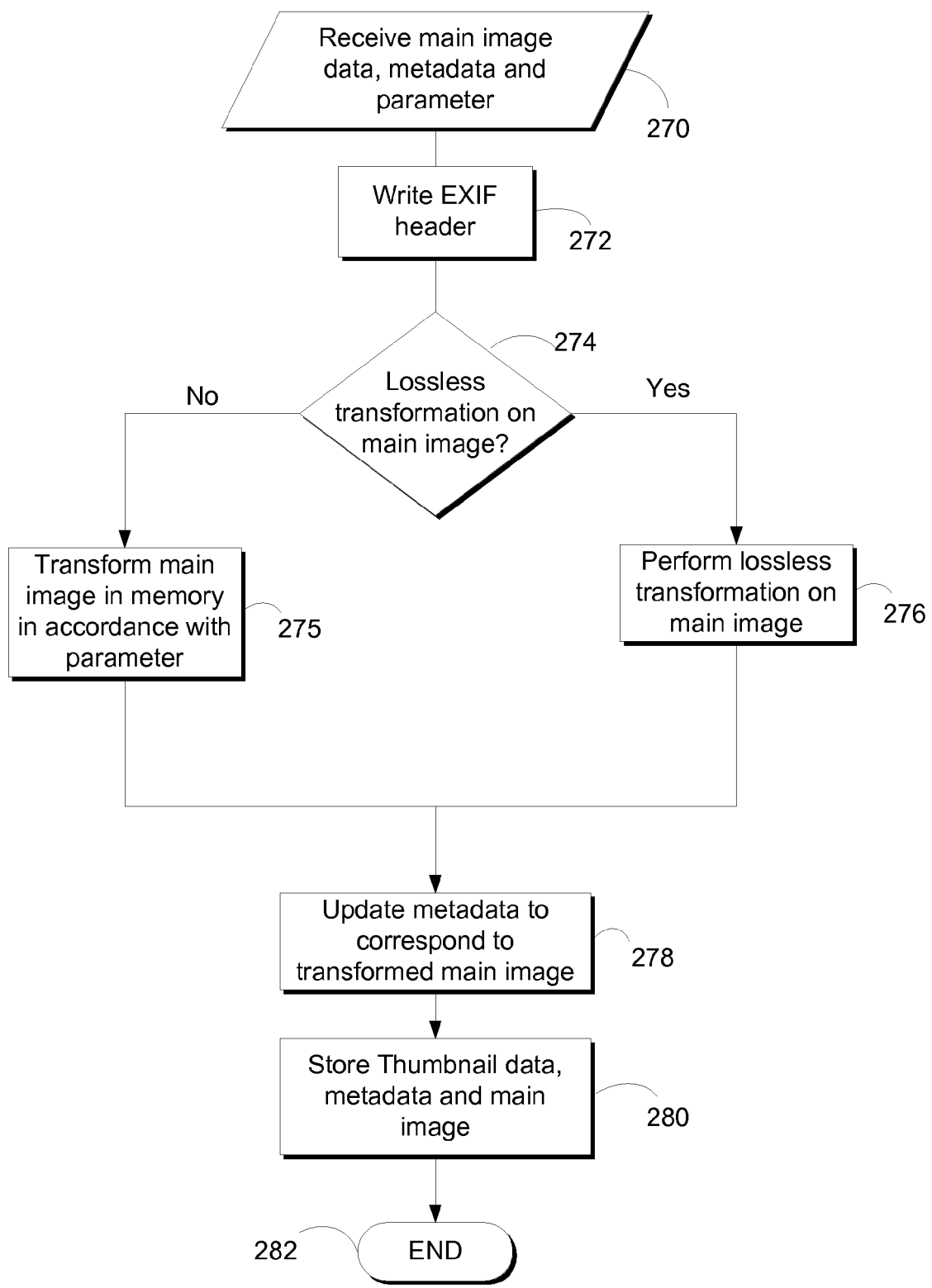
FIG. 6 is a flow chart illustrating the encoder object of an embodiment of the invention.

FIG. 6 illustrates the overall operation of the encoder object 216 of an embodiment of the invention. At step 270, the encoder object receives data for the main image, metadata and the parameter. The encoder object then proceeds to store this data in a file using the EXIF format. Thus, at step 272, the encoder object writes the EXIF header information. The EXIF header information is defined by the EXIF standard and is well known to those skilled in the art. At step 274, it is then determined whether a lossless transformation of the main image has been requested and is possible. For example, a main image is provided in a compressed format, such as the JPEG format, which is a lossy format. Certain lossless transformations may be possible on a JPEG image, such as a 90-degree rotation or a horizontal or vertical flip. If such a transformation is possible and requested, it is then performed at step 276. If such a transformation is either not possible or not requested, then a lossy or other transformation is performed at step 275. Control then passes to step 278, and the encoder object updates the metadata to correspond to the transformed main image. Such updating step could include, for example, updating the ExifImageWidth and ExifImageHeight tags to reflect changes, respectively, to the width or height of the main image as transformed.

At step 280, the transformed main image, updated metadata, and the thumbnail image are stored in a file in the EXIF format. Writing the information to the EXIF-format file could occur in a variety of ways. For example, a data structure may be created to store the metadata along with the corresponding metadata tags. Such tags may include EXIF tags, Global Positioning System (GPS) tags, thumbnail tags and others. The tags may be sorted based on the tag identified, which could either be the alphanumeric name or the hexadecimal value associated with the tag. The EXIF standard defines an "image file directory" or "IFD" as a portion of the file containing metadata or image data for a given digital image. The first IFD in an EXIF file is known as the $0^{th}$ IFD, which contains the main image information. In particular, the $0^{th}$ IFD contains a pointer pointing to the location in the file of the $1^{st}$ IFD, which typically contains the thumbnail data for the $0^{th}$ IFD main image. Thus, following the sorting step, the $0^{th}$ IFD value may be written to the EXIF file. Such writing step may also include writing any GPS information to the EXIF file. Metadata contained in the $1^{st}$ IFD for the thumbnail image of the $0^{th}$ IFD main image could then be written followed by the thumbnail image itself and, lastly, the main image. In this way, a digital image could be stored to a file in the EXIF format.

In operation, a consumer could use the embodiments of the invention in a variety of ways. The consumer may begin by taking a picture using a digital camera that stores digital images in the EXIF-format. The EXIF images may be stored on a compact flash memory card or other writeable storage device. The consumer may then remove the compact flash card or other storage media from the digital camera and provide the media to a personal computer for transferring the digital image from the media to the personal computer. The consumer may use software incorporating the embodiments of the invention to obtain the main image and metadata associated with a digital image in the EXIF file for transformation. The main image is transformed in accordance with a parameter provided by the consumer to describe a desired transformation. The metadata is thereupon updated in accordance with the parameter and the transformation and the updated metadata is stored in the EXIF format, which may be viewed on the personal computer or transferred to the digital camera for later viewing.

From the foregoing, the embodiments of the invention may provide a consumer with a valuable way to view digital images created with a digital camera or other digital photo device. By enabling consumers to apply transformations to the digital images and store the resulting transformed digital image data to a properly constituted EXIF-format file, consumers are spared many of the problems in attempting to rotate or otherwise transform conventional digital images. The various computer systems and components shown in FIGS. 1-6 and described in the specification are merely exemplary of those suitable for use in connection with the embodiments of the invention. For example, other embodiments are contemplated hereby, such as computer-readable media, including read-only memory devices associated with digital cameras having a microprocessor or other controller for transforming EXIF images without the use of a personal computer. Accordingly, the scope of the invention is defined by the appended claims rather than the foregoing description.

We claim:

1. A method of transforming a digital image in accordance with a parameter for transformation, the method comprising:

accessing an EXIF stream of data containing the digital image, the EXIF stream having a main image, simple metadata, and complex metadata, wherein the complex metadata comprises a thumbnail image corresponding to the main image;

decoding the EXIF stream by extracting the main image and metadata including the thumbnail image from the EXIF stream;

if the thumbnail image is not in JPEG compressed format, converting the thumbnail image to the JPEG compressed format;
performing transformation on the JPEG compressed thumbnail image in accordance with the parameter;
updating the simple metadata to reflect the changes of the main image as transformed; and
storing, in an EXIF encoded file, the transformed main image, the updated simple metadata, and complex metadata including the transformed thumbnail image.

2. The method of claim 1, wherein said step of updating the simple metadata includes updating the simple metadata to contain height and width dimensions of the transformed image.

3. The method of claim 1, wherein the main image is transformed by rotating the main image a known amount to produce the transformed main image and the thumbnail image is transformed by rotating the thumbnail image by the known amount to produce the transformed thumbnail image having a viewing orientation corresponding to the viewing orientation of the transformed main image.

4. The method of claim 1, wherein the parameter alters a bit depth associated with the main image.

5. The method of claim 1, wherein the parameter alters a color associated with the main image.

6. The method of claim 1, wherein the parameter is associated with lossless transformations.

7. The method of claim 1, further comprising for the transformed main image, the updated simple metadata, and complex metadata including the transformed thumbnail, generating image file directories and sorting tags associated with the simple metadata and complex metadata.

8. One or more computer readable media executing instruction to perform a method of transforming a digital image in accordance with a parameter for lossless transformation, the method comprising:
accessing an EXIF stream of data containing the digital image, the EXIF stream having a main image, simple metadata, and complex metadata, wherein the complex metadata comprises a thumbnail image corresponding to the main image;
decoding the EXIF stream by extracting the main image and metadata including the thumbnail image from the EXIF stream;
if the thumbnail image is not in JPEG compressed format, converting the thumbnail image to the JPEG compressed format;
performing transformation on the JPEG compressed thumbnail image in accordance with the parameter;
updating the simple metadata to reflect the changes of the main image as transformed; and
storing, in an EXIF encoded file, the transformed main image, the updated simple metadata, and complex metadata including the transformed thumbnail image.

9. The media of claim 8, wherein said step of updating the simple metadata includes updating the simple metadata to contain height and width dimensions of the transformed image.

10. The media of claim 8, wherein the main image is transformed by rotating the main image a known amount to produce the transformed main image and the thumbnail image is transformed by rotating the thumbnail image by the known amount to produce the transformed thumbnail image having a viewing orientation corresponding to the viewing orientation of the transformed main image.

11. The media of claim 8, wherein the parameter alters a bit depth associated with the main image.

12. The media of claim 8, wherein the parameter alters a color associated with the main image.

13. The media of claim 8, further comprising for the transformed main image, the updated simple metadata, and complex metadata including the transformed thumbnail, generating image file directories and sorting tags associated with the simple metadata and complex metadata.

14. A computer system having a processor, a memory, and an operating environment, the computer system comprising:
a decoder object that accesses an EXIF stream of data containing the digital image, the EXIF stream having a main image, simple metadata, and complex metadata, wherein the complex metadata comprises a thumbnail image corresponding to the main image and that extracts, from the EXIF stream, the main image, simple metadata, and complex metadata associated with the main image;
a bitmap object that transforms the thumbnail image in accordance with the parameter to produce a transformed thumbnail image, wherein if the thumbnail image is not in JPEG compressed format, converting the thumbnail image to the JPEG compressed format prior to transforming the thumbnail image; and
an encoder object that transforms the metadata in accordance with the parameter and stores the transformed main image data, the transformed thumbnail image and transformed metadata in the file using the EXIF format.

15. The system of claim 14, wherein transforming the metadata includes updating the simple metadata to contain the height and width dimensions of the transformed image.

16. The system of claim 14, wherein the main image is transformed by rotating the main image a known amount to produce the transformed main image and the thumbnail image is transformed by rotating the thumbnail image by the known amount to produce the transformed thumbnail image having a viewing orientation corresponding to the viewing orientation of the transformed main image.

17. The system of claim 14, wherein the parameter alters a bit depth associated with the main image.

18. The system of claim 14, wherein the parameter alters a color associated with the main image.

19. The system of claim 14, wherein the parameter is associated with lossless transformations.

20. The system, of claim 14, further comprising for the transformed main image, the updated simple metadata, and complex metadata including the transformed thumbnail, the encoder object generates image file directories and sorts tags associated with the simple metadata and complex metadata.

* * * * *